(12) United States Patent
Seto et al.

(10) Patent No.: US 9,383,840 B2
(45) Date of Patent: Jul. 5, 2016

(54) METHOD AND APPARATUS TO REDUCE DISPLAY LAG USING IMAGE OVERLAY

(71) Applicant: Samsung Display Co., Ltd., Yongin, Gyeonggi-do (KR)

(72) Inventors: Frank Seto, San Jose, CA (US); Wei Xiong, Mountain View, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 79 days.

(21) Appl. No.: 14/226,776

(22) Filed: Mar. 26, 2014

(65) Prior Publication Data
US 2014/0313144 A1 Oct. 23, 2014

Related U.S. Application Data

(60) Provisional application No. 61/814,750, filed on Apr. 22, 2013.

(51) Int. Cl.
*G06F 3/041* (2006.01)
*G06F 3/0488* (2013.01)

(52) U.S. Cl.
CPC .............. *G06F 3/041* (2013.01); *G06F 3/0416* (2013.01); *G06F 3/0488* (2013.01)

(58) Field of Classification Search
None
See application file for complete search history.

(56) References Cited

U.S. PATENT DOCUMENTS

| | | | | |
|---|---|---|---|---|
| 2010/0079394 | A1* | 4/2010 | Tanaka et al. | 345/173 |
| 2010/0271313 | A1 | 10/2010 | Low et al. | |
| 2010/0277429 | A1* | 11/2010 | Day et al. | 345/173 |
| 2010/0277505 | A1 | 11/2010 | Ludden et al. | |
| 2011/0310118 | A1* | 12/2011 | Asmi et al. | 345/619 |
| 2013/0201112 | A1 | 8/2013 | Large et al. | |
| 2014/0168096 | A1* | 6/2014 | Bathiche | G06F 3/147 345/173 |

FOREIGN PATENT DOCUMENTS

| | | |
|---|---|---|
| KR | 10-2005-0029511 | 3/2005 |
| KR | 10-2010-0122383 | 11/2010 |
| KR | 10-2012-0092037 | 8/2012 |

OTHER PUBLICATIONS

Extended European Search Report dated Oct. 2, 2014 for European Patent Application No. EP 14165516.7, 13 pages.
Gutwin, C. et al., "Improving Interpretation of Remote Gestures with Telepointer Traces", Proceedings of the 2002 ACM Conference on Computer Supported Cooperative Work, CSCW '02, Nov. 16, 2002, 10 Pages, XP055141929, New York, New York, USA.
Ng, A. et al., "Designing for Low-Latency Direct-Touch Input", Proceedings of UIST '12, Oct. 7, 2012, pp. 453-464, XP055141925, Retrieved from the Internet: URL:http://edgey.com/wp-content/uploads/2013/01/p453-ng.pdf.

* cited by examiner

*Primary Examiner* — Dwayne Bost
*Assistant Examiner* — Christopher Kohlman
(74) *Attorney, Agent, or Firm* — Lewis Roca Rothgerber Christie LLP

(57) ABSTRACT

A system includes a touch path logic configured to receive a plurality of touch events and to generate an output based on the touch events; and a rendering logic configured to receive a video image; receive the output of the touch path logic; combine the video image with overlay data in accordance with the output of the touch path logic to generate a combined display image; and output the combined display image.

42 Claims, 7 Drawing Sheets

METHOD AND APPARATUS TO REDUCE DISPLAY LAG USING IMAGE OVERLAY

CROSS-REFERENCE TO RELATED APPLICATION(S)

This patent application claims the priority to and the benefit of U.S. Provisional Application Ser. No. 61/814,750, filed Apr. 22, 2013, titled "A Method and Apparatus to Reduce Display Lag Using Image Overlay," the entire content of which is incorporated herein by reference.

BACKGROUND

1. Field

Embodiments of the present invention relate to display devices with touch input devices and, more specifically, systems and methods for reducing display lag between the touch input device and the display device.

2. Related Art

Display panels incorporating or coupled to overlaid touch sensor panels provide an interaction system for touch-enabled computing devices such as mobile phones, tablet computers, laptop computers, and desktop computers. In such computing devices, graphics are displayed on the display panel and a user can interact with these devices by touching the screen (e.g., using an active stylus, a passive stylus, or a body part such as a finger), thereby providing an intuitive user interface.

Touch events detected by the touch sensor panels are typically processed by high level application software running on an application processor (AP) of the device. The many processing steps between the touch sensor panel and the AP and the non-deterministic processing time on the AP (including delays due to other computational tasks being performed by the AP) introduce high levels of latency (e.g., 70 to 100 milliseconds) that reduce responsiveness of the computing device to the user's touch inputs.

Some empirical studies have indicated that most humans can detect even a 30 millisecond asynchrony between senses, such as touch and vision (see, e.g., Keetels, M. and Vroomen, J. (2012). Perception of Synchrony Between the Senses. In M. M. Murray and M. T. Wallace (Eds.), Frontiers in the neural basis of multisensory processes (pp. 147-177). London: Taylor & Francis Group). Delays of 50 to 200 milliseconds would be detectable to most of users of these computing devices, which can lead to increased user frustration due to the failure of computing the device to immediately provide feedback to the user's input.

SUMMARY

Aspects of embodiments of the present invention are directed to reducing the latency between a touch event and the display response to this touch event.

According to one embodiment of the present invention, a system includes: a touch path logic configured to receive a plurality of touch events and to generate an output based on the touch events; and a rendering logic configured to: receive a video image; receive the output of the touch path logic; combine the video image with overlay data in accordance with the output of the touch path logic to generate a combined display image; output the combined display image.

The video image may include a displayed line and characteristics of the overlay data may match characteristics of the displayed line.

The characteristics may include a color.

The touch path logic may be a component of an application processor, the application processor being configured to generate the video image.

The touch path logic may be a component of a display driver interface controller, the display driver interface controller may be configured to receive the video image from an application processor and to supply the combined display image to a display panel.

The touch path logic may be a component of a touch controller coupled to a touch sensor panel, the touch controller may be configured to receive a plurality of touch signals from the touch sensor panel and to generate the touch events.

The touch path logic may be configured to receive the touch events from a touch sensor panel and to generate mask data in accordance with the received touch events, the mask data including a matrix of numerical values, each of the numerical values identifying an operation of the rendering logic to produce the combined display image, and wherein positions of the numerical values within the matrix may correspond to positions of pixels in the combined display image.

The rendering logic may be configured to combine the video image with the overlay data by determining, for each pixel in the combined display image, whether to output a corresponding pixel of the video image or the overlay data in accordance with a value in a corresponding position in the mask data.

The rendering logic may be configured to combine the video image with the overlay data by determining, for each pixel in the combined display image, how to blend a corresponding pixel of the video image and the overlay data in accordance with a value in a corresponding position in the mask data.

The blend may be an edge-enhance operation, a dodge operation, a burn operation, or an alpha compositing effect.

Each of the numerical values of the mask data may correspond to exactly one pixel in the combined display image.

Each of the numerical values of the mask data may correspond to more than one pixel in the combined display image.

The overlay data may include a plurality of pages, and the mask data may include information identifying at least one of the plurality of pages.

The touch path logic may be further configured to: receive a parameter; compute an estimated touch path in accordance with the touch events; and generate the mask data in accordance with the estimated touch path and the parameter, wherein the parameter controls a location of a mask region or controls a width, a style, or a shape of the estimated touch path.

The system may further include: an application processor configured to generate the video image, wherein the rendering logic may be a component of the application processor.

The rendering logic may be further configured to combine the video image with the overlay data based on a subset of the touch events, the subset corresponding to a fixed number of video images.

The rendering logic may be further configured to combine the video image with the overlay data based on a subset of the touch events corresponding to a number of video images corresponding to a delay introduced by an application processor configured to supply the video image to the rendering logic.

The rendering logic may be further configured to combine the video image with the overlay data based on a subset of the touch events corresponding to a number of video images computed from a prior rendered output of an application processor configured to supply the video image to the rendering logic.

The overlay data may include a bitmapped image.

The overlay data may have a single color value.

The rendering logic may be configured to generate the overlay data without input from an application processor.

The rendering logic may be configured to generate the overlay data using data supplied from an application processor and data internal to the system.

The rendering logic may be configured to receive the overlay data from an application processor.

The touch events may be generated as the result of an interaction between a pointing implement and a touch input panel.

According to one embodiment of the present invention, a method for providing visual feedback to touch input includes: receiving a plurality of touch events from a touch sensor panel coupled to a display; receiving a video image; combining the video image with overlay data in accordance with the touch events to generate a combined display image; and supplying the combined display image to the display.

The method may further include: receiving a parameter; and computing an estimated touch path in accordance with the touch events, wherein the video image may be combined with the overlay data in accordance with the estimated touch path and the parameter, and wherein the parameter may control a location of the overlay data in the combined display image or may control a width, a style, or a shape of the estimated touch path.

The method may further include computing an estimated touch path in accordance with the touch events, wherein the video image may be combined with the overlay data in accordance with the estimated touch path, and wherein the estimated touch path may be computed based on a subset of the touch events corresponding to a fixed number of frames.

The method may further include computing an estimated touch path in accordance with the touch events, wherein the video image may be combined with the overlay data in accordance with the estimated touch path, and wherein the estimated touch path may be computed based on a subset of the touch events corresponding to a number of frames corresponding to a delay introduced by an application processor.

The method may further include computing an estimated touch path in accordance with the touch events, wherein the video image may be combined with the overlay data in accordance with the estimated touch path, and wherein the estimated touch path may be computed based on a subset of the touch events corresponding to a number of frames computed from a prior rendered output of an application processor.

The overlay data may include a bitmapped image.

The overlay data may have a single color value.

The method may further include generating the overlay data without input from an application processor.

The method may further include generating the overlay data using data supplied from an application processor and internal data.

The method may further include receiving the overlay data from an application processor.

The combining of the video image with the overlay data in accordance with the touch events to generate the combined display image may include: generating mask data based on the touch events, the mask data including a matrix of numerical values, each of the numerical values identifying an operation to produce the combined display image, and wherein positions of the numerical values within the matrix correspond to positions of pixels in the combined display image.

The method may further include determining, for each pixel in the combined display image, whether to output a corresponding pixel of the video image or the overlay data in accordance with a value in a corresponding position in the mask data.

The method may further include determining, for each pixel in the combined display image, how to blend a corresponding pixel of the video image and the overlay data in accordance with a value in a corresponding position in the mask data.

The blend may be an edge-enhance operation, a dodge operation, a burn operation, or an alpha compositing effect.

Each of the numerical values of the mask data may correspond to exactly one pixel in the combined display image.

Each of the numerical values of the mask data may correspond to more than one pixel in the combined display image.

The overlay data may include a plurality of pages, and the mask data may include information identifying at least one of the plurality of pages.

The touch events may be generated as the result of an interaction between a pointing implement and the touch input panel.

According to one embodiment of the present invention, an accelerator for providing feedback in response to a path drawn on a display device including a touch sensor panel, an application processor, and a display includes: a processor; and a memory having instructions stored thereon that, when executed by the processor, cause the processor to: receive rendered video frames from the application processor; receive a plurality of touch signals from the touch sensor panel; determine a touch path based on the touch signals; update the rendered video frames based on the touch path and stored overlay data to generate updated video frames; and output the updated video frames to the display.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1B:
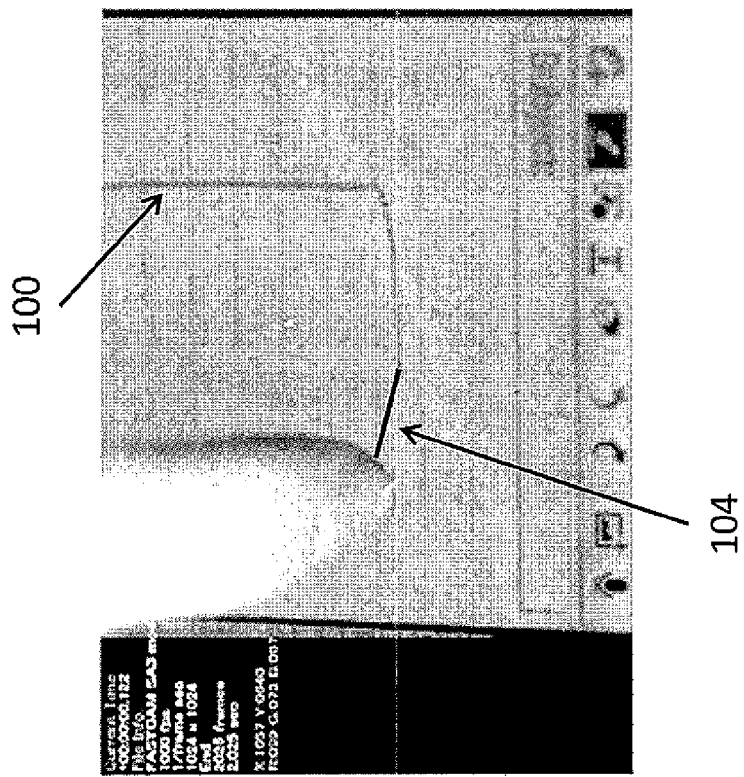
FIG. 1B illustrates the response of a device including a touch input processing device according to embodiments of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Embodiments of the present invention allow a user to perceive a faster touch response by displaying an image based on the touch locations in advance of the application processor rendered image.

Software designed for touch interfaces often utilize a metaphor of direct physical manipulation of pseudo "real-world" objects and/or the drawing of paths on the screen to provide visual feedback (e.g., for the trace of a finger on a swiping or gesture-based on-screen keyboard, for the trace of a path in a drawing or sketchbook application, and for a path drawn in a game).

A common complaint of mobile phones is the lag of the user interface (UI). Current mobile phones typically take 50 to 200 milliseconds to update the display in response to a touch action. For example, the typical display response time to a touch event as measured on a Samsung® Galaxy Note® 2 phone may be more than 100 milliseconds or roughly over 6 frames of video images, based on a refresh rate of 60 frames per second (FPS), which is noticeable by a large portion of users.

Figure 1A:
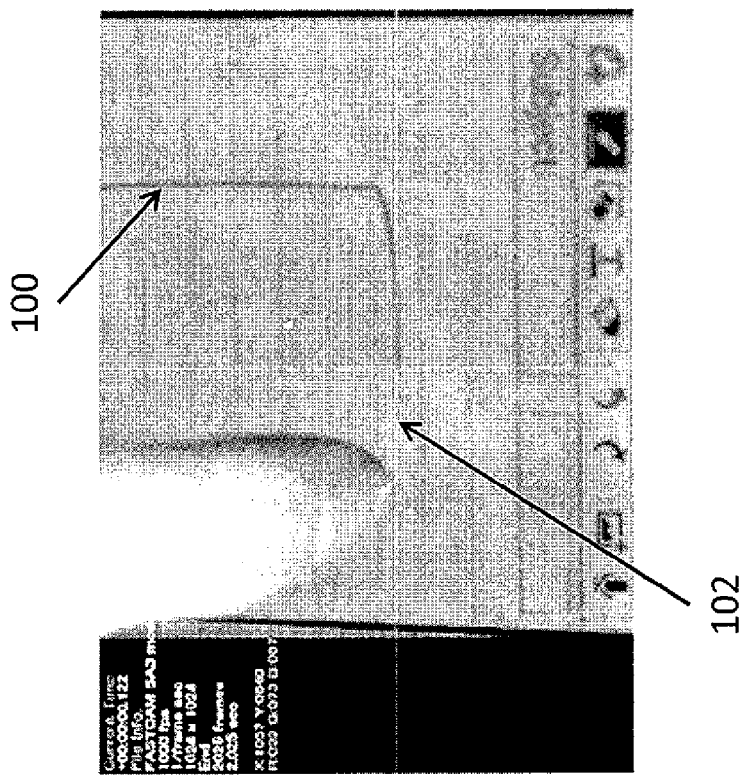
FIG. 1A illustrates the response of a device including a conventional touch input processing device.

FIG. 1A illustrates the response of a device including a comparable touch input processing device, where the displayed line 100 has a gap 102 between the position of a finger and the last drawn portion of the displayed line 100, thereby causing noticeable display lag between the user's touch and the displayed line. Similar display lag is also typically encountered when using a stylus, whether active or passive.

Embodiments of the present invention allow the user to perceive a faster touch response by overlaying an image in the touch path in advance of the AP rendered image. By closing the gap between the user's touch point (whether using a finger, stylus, or other implement) and the drawing of the line on the screen, the perceived display lag can be decreased. As used herein, the term "overlay" when used as a verb refers to combining video images (e.g., a AP rendered image) and additional image data such that the additional image data replaces (or "overlays") some portion of the original video images. The term "overlay" when used as a noun may also refer to the appearance of that additional image data in the combined display image.

In addition, by using an overlay method, application software can also control the region (e.g., location on the display), color, and rendering operation of the displayed response to a touch event.

FIG. 1B illustrates the displayed response of a device including a touch input processing device according to embodiments of the present invention, where the displayed line includes an estimated or computed portion 104 that is drawn by a low latency overlay system according to embodiments of the present invention, thereby reducing the display lag perceived by the user.

Figure 2:
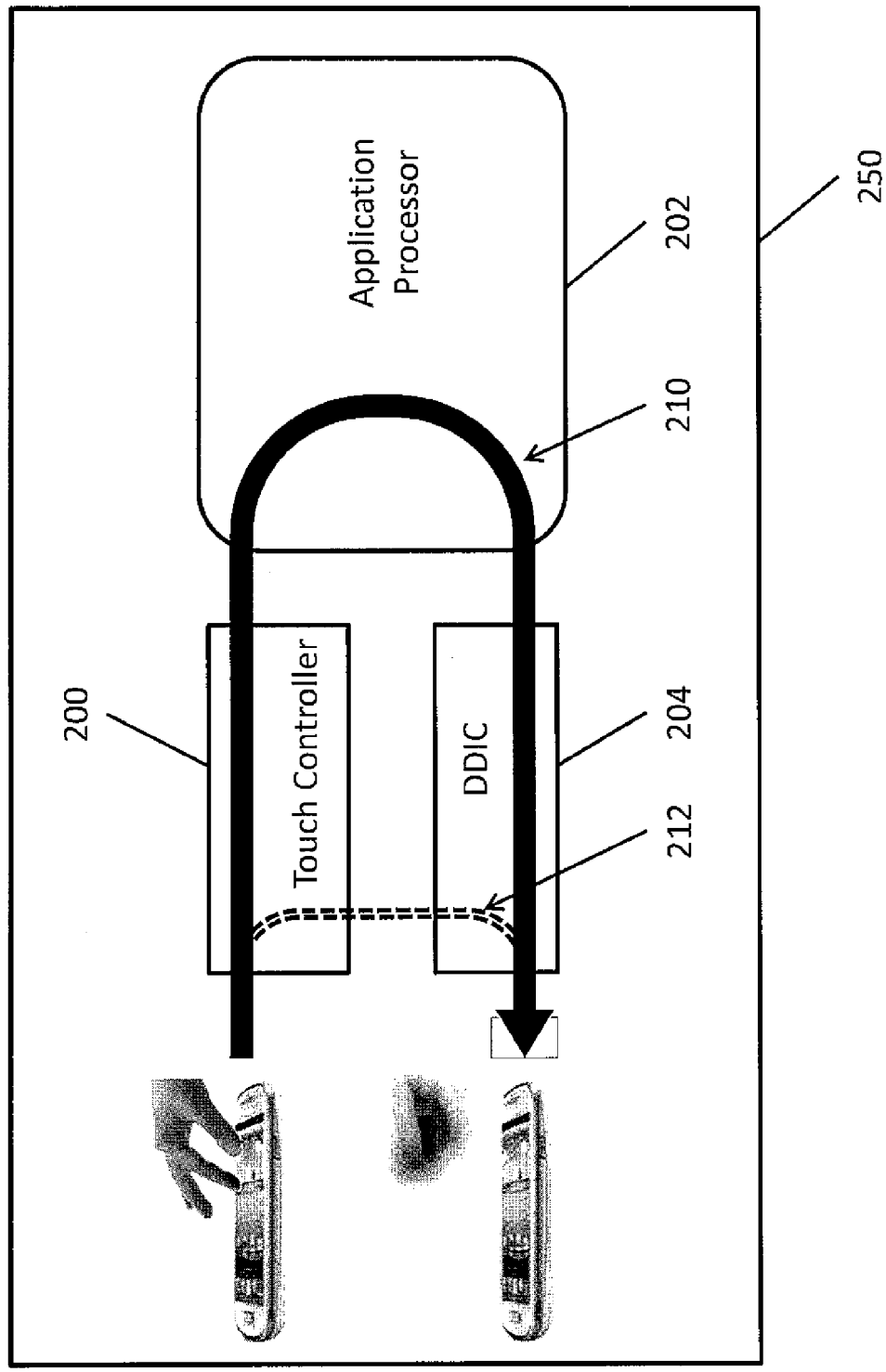
FIG. 2 is a schematic illustration of both a low latency feedback path and a conventional feedback path according to one aspect of embodiments of the present invention.

Referring to FIG. 2, in a computing device 250, as an alternative to comparable systems, embodiments of the present invention are directed to a low latency overlay system (which may be referred to as an "accelerator" or "visual feedback accelerator") that provides visual feedback immediately or more quickly over a low latency path 212 through a touch controller 200 and a display driver interface controller (DDIC) 204, followed by visual images at conventional levels of latency over a conventional latency path 210 through an application processor 202.

Figure 3:
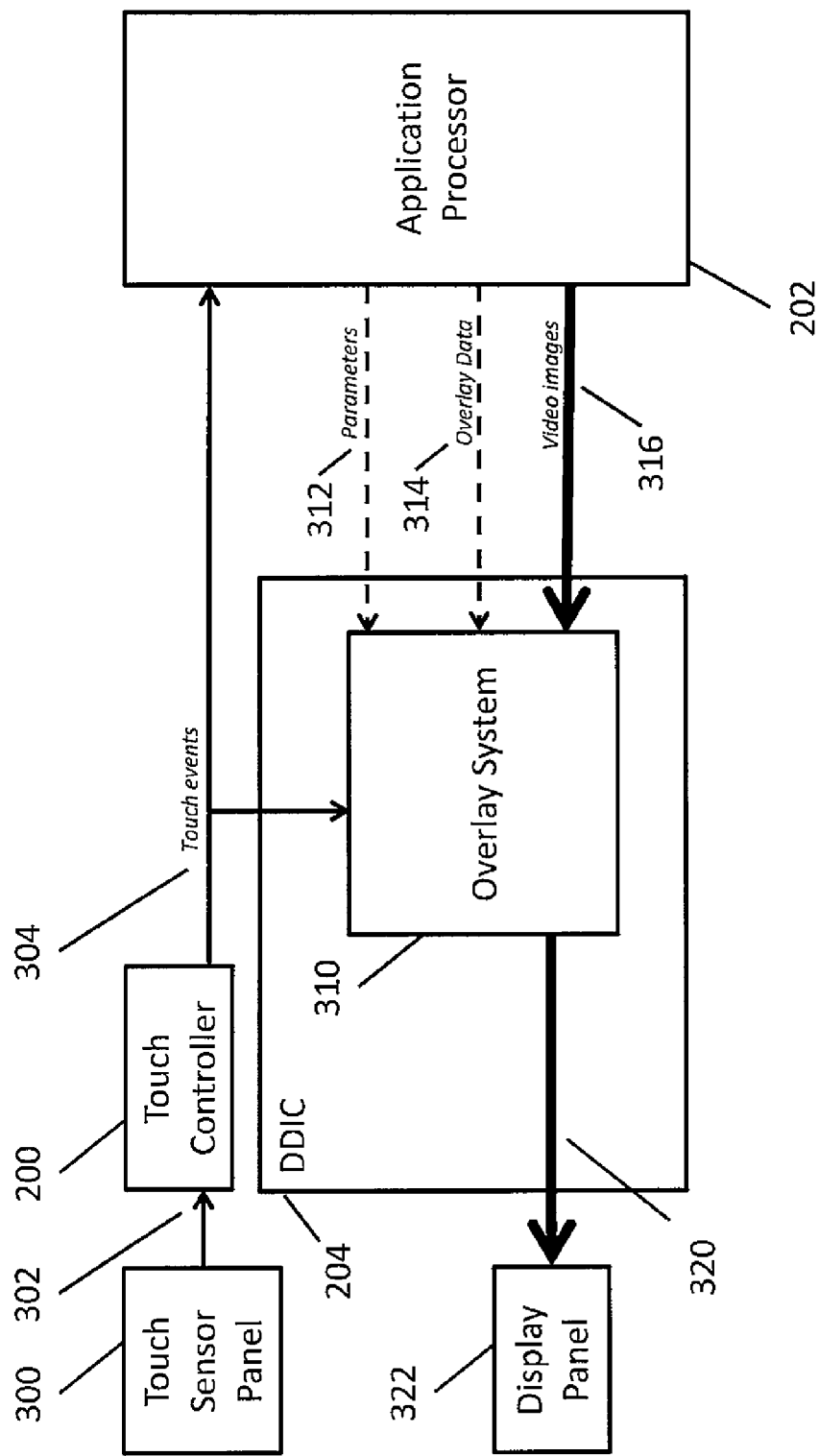
FIG. 3 is a block diagram illustrating a device including a low latency overlay system according to one embodiment of the present invention.

Referring to FIG. 3, typically a touch screen system and display system operate independently. A touch controller 200 processes the touch signals 302 from a touch sensor panel 300 and outputs the touch events 304, such as coordinates, to the application processor (AP) 202.

Referring to FIG. 3, a touch sensor panel 300 is configured to detect a user's touches and generates touch signals 302 which are supplied to the touch controller 200 over a data bus. Embodiments of the invention can be used with touch sensor panels 300 that detect user's touch using any type of pointing implement, such as a body part (e.g., a finger), a stylus, etc. As used herein, the term "pointing implement" refers to objects that can be detected by a touch sensor panel 300 including devices (such as an active stylus and a passive stylus) and body parts (such as a finger or a hand). Embodiments of the present invention can be used with any of a variety of types of touch input panels such as resistive touch panels, surface acoustic wave touch panels, capacitive touch panels, infrared touch panels, and optical touch panels. In one embodiment, touch signals 302 correspond to the raw data supplied by the touch sensor panel 300, such as measurements of capacitance or voltage or current for each location in the touch sensor panel. The data bus for the touch events 304 is connected to both the AP 202 and the low-latency overlay system 310. The touch events 304 may be a stream of data values corresponding to locations at which touches by a user were detected (e.g., changes of capacitance or voltage or current of sufficiently high value to constitute the detection of a touch event). In some embodiments, the touch events 304 include pressure data indicating the pressure that was applied to the touch sensor panel.

The AP 202 processes the touch events 304, and application software running from the AP updates the display composition accordingly, by rendering video images 316 (or frames or video images) to the DDIC 204 for displaying on a display panel 322. The AP 202 may include a central processing unit (CPU), a graphical processing unit (GPU), and memory.

The AP 202 is connected to a DDIC 204 which, in turn, is connected to the display panel 322. The DDIC 204 receives the video images 316 from the AP 202 and supplies pixel driving signals 320 to the display panel 322.

In one embodiment, the touch sensor panel 300, the touch controller 200, the DDIC 204, and the display panel 322 are all components of a display module, which may be separate from the application processor 202. In another embodiment, the touch sensor panel 300, the touch controller 200, the DDIC 204, and the display panel 322, or combinations thereof, may reside in separate modules, or be combined with the application processor.

The DDIC 204 processes the video images (or frames of video images) 316 received from the application processor 202, and outputs pixel driving signals 320 to the display panel.

The functions of the parameter 312 and the overlay data 314 will be described in more detail below.

According to embodiments of the present invention, the low-latency overlay system 310 processes touch events 304 with the video images 316 so that the display panel 322 can show the visual responses to the touch event faster than in comparable implementations. In contrast to the approximately 6 frames or more display lag in some comparable devices, embodiments of the present invention can reduce the lag to 1 to 2 frames.

Figure 4:
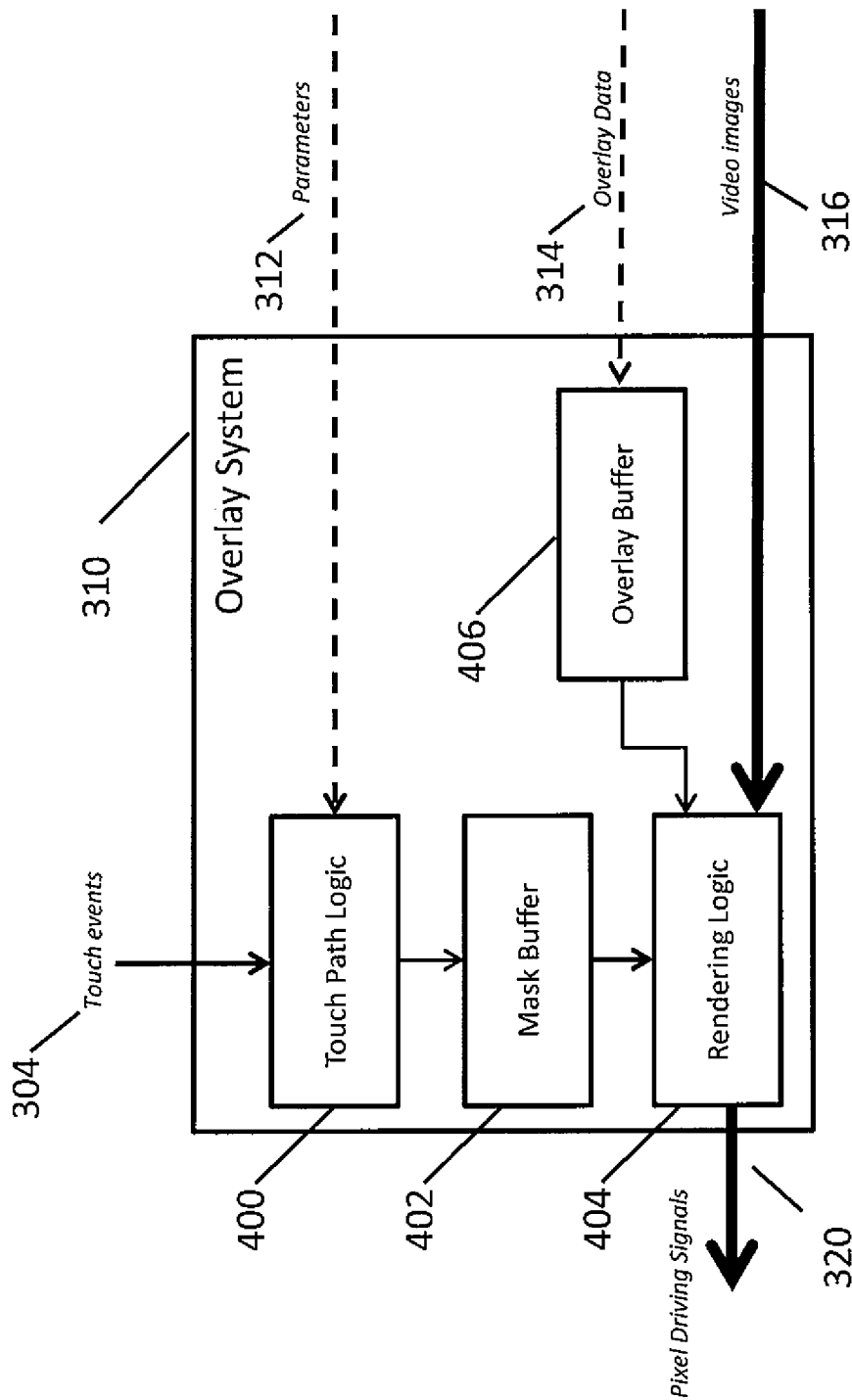
FIG. 4 is a block diagram illustrating the components within a low latency overlay system according to one embodiment of the present invention.

In more detail, FIG. 4 is a block diagram illustrating a device including a low latency overlay system 310 according to one embodiment of the present invention. Referring to FIG.

4, embodiments of the present invention include four major parts: touch path logic 400, mask buffer 402, overlay buffer 406, and rendering logic 404. The overlay system 310 may be included as a component of a DDIC 204, or portions of the overlay system 310 may be included in a DDIC 204 or a AP 202 and other portions may be included in a touch controller 200.

As shown in FIG. 4, in one embodiment the touch path logic 400 is connected to the touch controller 200 and receives touch events 304 from the touch controller 200. The touch path logic 400 may also be connected to the AP 202 to receive configuration parameters 312. The touch path logic 400 is also connected to mask buffer 402, which is used by the rendering logic 404.

According to one embodiment, the overlay buffer 406 is a memory device within the DDIC 204 that is connected to the AP 202 and that stores overlay data 314 received from the AP 202. The overlay buffer 406 is configured to supply the stored overlay data 314 to the rendering logic 404. However, embodiments of the present invention are not limited thereto. For example, in one embodiment, the overlay data 314 may be created internal to the overlay system 310 without inputs from the AP 202. In yet another embodiment, the overlay data 314 may be a combination of data created internal to the overlay system 310 and data corresponding to the inputs from the AP 202.

According to one embodiment, the rendering logic 404 is coupled to the AP 202 and the overlay buffer 406 and is configured to combine the overlay data 314 with the video images 316 in accordance to the values in mask data 500. The output of the rendering logic 404 is connected to the display panel 322 to supply the combined display images of the overlay data 314 and the video images 316 to the display panel 322 as pixel driving signals 320.

However, embodiments of the present invention are not limited thereto.

For example, in one embodiment, the touch path logic 400, mask buffer 402, overlay buffer 406, and rendering logic 404 are each implemented using different application specific integrated circuits (ASICs). In other embodiments of the present invention, a single ASIC is used to implement all functions. In still other embodiments of the present invention, a field programmable gate array (FPGA) is programmed to perform the functions of each of the touch path logic 400, the mask buffer 402, the overlay buffer 406, and the rendering logic 404. Alternatively, a general purpose processor may be programmed (e.g., with instructions stored in memory connected to the general purpose processor) to perform the functions of each of the touch path logic 400, the mask buffer 402, the overlay buffer 406, and the rendering logic 404. In still other embodiments, the functionality of one or more of the touch path logic 400, mask buffer 402, overlay buffer 406, and rendering logic 404 are implemented as components of the application processor 202.

Furthermore, although the touch path logic 400, the mask buffer 402, the overlay buffer 406, and the rendering logic 404 are shown in FIG. 4 as being components of the DDIC 204, embodiments of the present invention are not limited thereto. In some embodiments, one or more of the touch path logic 400, the overlay buffer 314, the mask buffer 402, and the rendering logic 404 (or components capable of performing these functions) are located within, for example, the touch controller 200, AP 202, or as a separate component. In addition, the components or the functions they perform may be located in different portions of the device. For example, the touch path logic 400 may be implemented as a component or a function of the touch controller 200 and both the overlay buffer 406, and the rendering logic 404 may be implemented as a component (or components) or a function (or functions) of the AP 202.

In addition, although the touch controller 200 is illustrated as a physically separate component, in some embodiments of the present invention the touch controller 200 is a portion of a larger integrated circuit. For example, the touch controller may be implemented in a same integrated circuit along with an AP and/or a DDIC.

Figure 5:
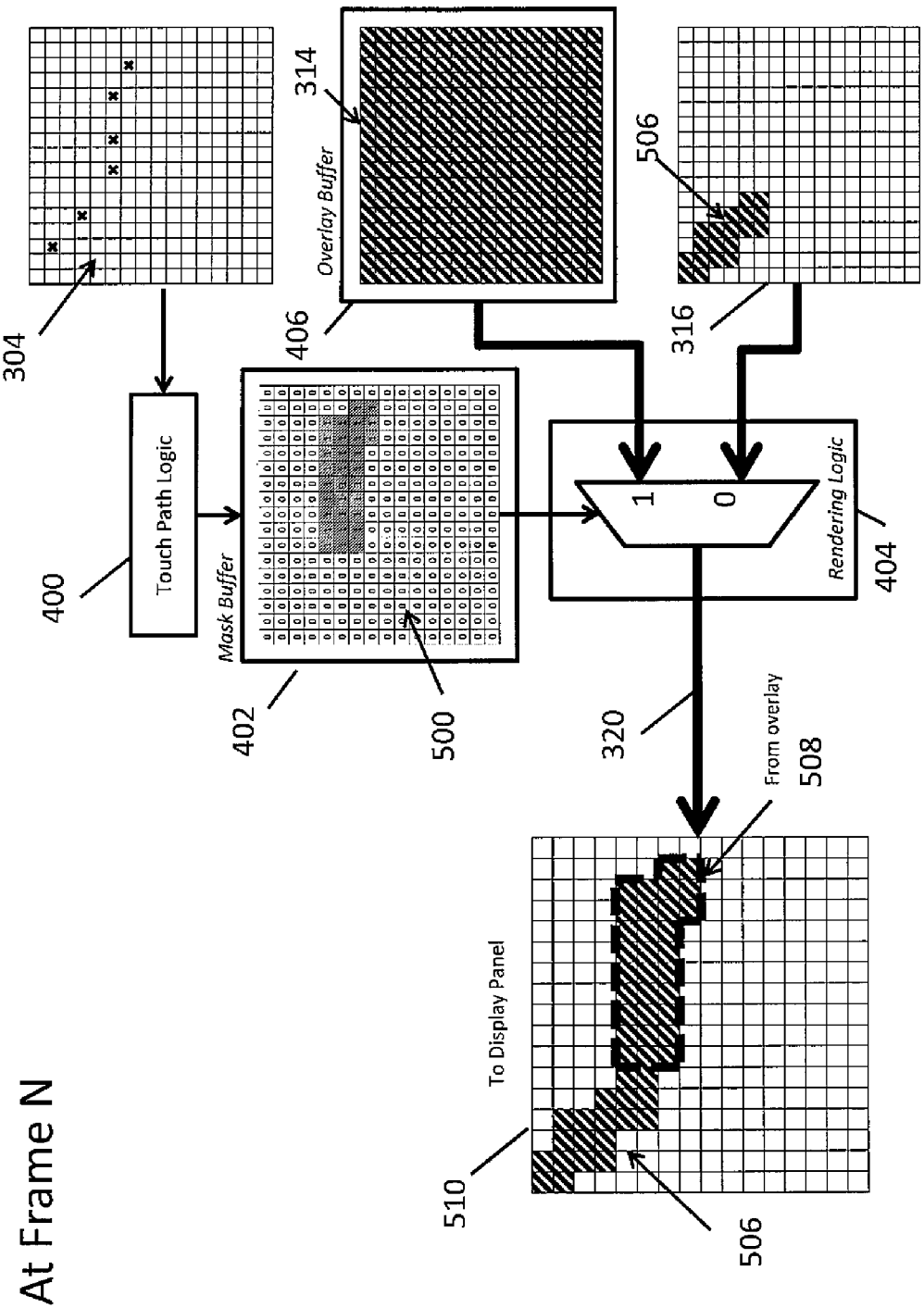
FIG. 5 is a schematic illustration of the combination of video image data, overlay data, and touch path information to generate first combined display image, in accordance with one embodiment of the present invention.

FIG. 5 is a schematic illustration of the combination of video images 316 (or frames of video images), overlay data 314, and touch events 304 to generate a first set of combined display images 510 during an Nth frame (e.g., to generate Frame N), in accordance with one embodiment of the present invention. Referring to FIG. 5, the touch path logic 400 processes the touch events 304 from the touch controller and generates an estimated touch path by interpolating and/or extrapolating between the locations of a subset of the received touch events, for example a set of successive touch events, over a number of previous consecutive frames (e.g., the past X frames). The estimated touch path is then applied by the touch path logic 400 to generate mask data 500, which are stored within the mask buffer 402. The rendering logic combines the overlay data 314 stored in the overlay buffer 406 with the video image for Frame N from the AP 202 in accordance with the mask data 500 to generate the combined display image 510 by selecting between (or blending) the overlay data 314 and the video images 316.

According to one embodiment, the mask data 500 is a matrix of numerical values, wherein a position in the matrix corresponds to a position of a pixel (or pixels) in the display panel 322 and wherein the relative positions of the values in the matrix correspond to the relative positions of the pixels in the display panel 322 (e.g., the mask data 500 may be thought of as a two-dimensional matrix corresponding to a two-dimensional map of the pixel positions in the combined display image 510). According to one embodiment, each of the values of the mask data 500 is represented as a single bit, and the positions of the values in the mask data matrix correspond to positions in the combined display image. Positions where the overlay data are to be shown in the combined display image have the values set to a first value (e.g., "1") and positions where the overlay data are not to be shown (e.g., where the video image data is to be shown) have values set to a second, different value (e.g., "0").

According to other embodiments of the present invention, each of the numerical values in the mask data 500 is represented by multiple bits (e.g., 8-bits), where the numerical value of the mask data 500 refers to the "transparency" of the overlay data at each location in the display. As used herein, the term "transparency" denotes a blending (e.g. merging) of the overlay data 314 and the video image 316 such that the combined display image 510 takes on characteristics of both the overlay data 314 and the video image 316.

Use of the mask buffer 402 by the rendering logic 404 will be described in more detail below.

In one embodiment, for each video frame, the touch path logic 400 generates the estimated touch path based on a subset of the touch events corresponding to a fixed number of video frames.

In another embodiment, the number of video frames is configurable to be in line with the display lag from AP 202.

In another embodiment, the touch path logic 400 generates a touch path for a variable number of video frames. The number of video frames can be determined from an external logic based on the past video images 316 from the AP 202.

A set of parameters 312 governs the characteristics of the estimated touch path when the path is generated. The parameters can have a start-up default, but may be adjusted as needed during run-time by software or other means. These parameters include, but are not limited to: width of path generated; style of line segments generated, such as simple straight segments or curves; region of the display wherein the path is allowed (e.g., the active drawing area); and the style of the rendering operation (e.g., antialiasing operations, smoothing operations, and transparency).

For example, when embodiments of the present invention are used in the context of a software application for drawing (e.g., a digital sketchbook), the overlay image segment 508 (which may also be referred to as computed portion 104), which is a portion of the combined display image 510, is only applied to portions of the display corresponding to the active drawing area. The overlay system 310 generally does not apply overlay data over portions of the display outside of the active drawing area. As such, parameters 312 can be set to restrict the estimated touch path to the portion of the display corresponding to the active drawing area. In another example, the parameters 312 can contain the line width of the drawn line. The touch path logic 400 will use this parameter along with the pressure data from the touch events 304 to render the shape of the line in the mask data 500 ahead of the AP-generated line (or image segment) 506 from the AP 202. (The image segment 506 may also be referred to as the displayed line 100.)

As each pixel of the video image 316 is processed by the rendering logic 404, the rendering logic 404 retrieves a value in the mask data 500 wherein the position of the value in the mask data (e.g. the position in a matrix) corresponds to the location of the pixel in the video image 316, and performs a substitution of the pixel of the video image 316 with the overlay data 314 or a blending of the pixel of the video image 316 and the overlay data 314 in accordance with the value in the mask data 500 to achieve desired visual effects (e.g. transparency and/or anti-aliasing), and outputs either the overlay data 314 or the pixel of video image 316, or a blending thereof, to the display panel 322 via the pixel driving signal 320.

For example, in the substitution embodiment of this invention, the rendering operation of the rendering logic 404 can be specified using a single bit as defined by the values in the mask data 500. The rendering operation selects the output of the rendering logic to be either the video image 316 or the overlay data 314 for each pixel based on the value at the position in the mask data 500 corresponding to the position of the pixel in the combined display image 510.

In one embodiment of the present invention, the number of values of (or size of) the mask data 500 equals to the number of pixels in one frame of the video images 316 which in turn equals to the number of pixels in the combined display image 510. Thus there is a one-to-one relationship between each value in the mask data 500 and each pixel of the video image 316. In other words, the substitution embodiment of the rendering logic 404 is performed by matching each value in the mask data 500 to a corresponding pixel in the video image 316 and outputting either the pixel of the video image 316 or the overlay data 314 to the display panel 322. For example, in one embodiment the rendering logic 404 iterates through each value of the mask data 500. If a value of 0 exists at a particular position in the mask data 500, then the rendering logic 404 outputs the corresponding pixel of the video image 316. On the other hand, if a value of 1 exists at a particular position in the mask data 500, then the rendering logic outputs the overlay data 314. As a result of the iterative process, the rendering logic 404 outputs a combined display image 510, as represented in the pixel driving signal 320 to the display panel 322.

In another embodiment of the present invention, the number of values in the mask data 500 may be less than the number of pixels in a frame of video images 316. Thus, each value in the mask data 500 may have a one-to-many relationship to the pixels of video images 316 such that a value in the mask data 500 corresponds to multiple pixels of a video image 316, thereby reducing the size of the mask data 500 and reducing the memory requirements of the mask buffer 402.

However, embodiments of the present invention are not limited thereto. In the blending embodiment of the present invention, the rendering operation of the rendering logic 404 can be specified using multiple bits as defined by the values in the mask data 500. For example, the values in the mask data 500 may identify the level of blending (e.g. the level of transparency) to be rendered by the rendering logic 404. In another example, if multiple rendering operations are supported by the rendering logic 404, one or more bits of the values in the mask data 500 can be used to define the desired rendering operation, while other bits can be used to adjust the specifications of those rendering operations. The rendering logic 404 can perform various rendering operations between the information carried in the video image 316 and the information carried in the overlay data 314, such as edge-enhance, dodge (lighten), burn (darken), etc. In other embodiments, the rendering operation may change the color or luminosity of portions of the video image 316, thereby generating a transparent coloring (or highlighter) effect or alpha compositing effect The rendering logic 404 receives two inputs, the first input contains the video images 316 from the AP 202, and the second input contains the overlay data 314 from the overlay buffer 406. The overlay buffer 406 stores the overlay data 314 to be processed by the rendering logic 404. The overlay data 314 can be provided by the AP 202 or created internally in the overlay system 310 wherein the characteristics of the overlay data 314 are determined by the desired output of the rendering logic 404. In one embodiment, the characteristics (e.g., the appearance) of the overlay data 314 are matched to the characteristics (e.g., the appearance) of the video image 316 along the displayed line 100 such that when rendered according to the mask data 500, the combined display image 510 contains a seamless transition between the image segment 506 and the overlay image segment 508. These characteristics may include a color. For example, if the application software draws a black line, then the overlay data 314 would be provided by the AP 202 or internally created by the overlay system 310 to contain the same black color (e.g., a bitmapped image where all the pixels are black) as the software-drawn line. The rendering logic 404 would output a combined display image 510 that contains a black line formed by adjoining the image segment 506 (e.g. the software-drawn black line) from the AP 202 and the overlay image segment 508 as determined by the mask data 500 and the overlay data 314. The overlay data 314 can also be textured or colored or may include bitmapped image data. Content of overlay data 314 can be dynamic over time and can be updated by the AP 202, or updated by a mechanism within the DDIC 204. The content can also be dynamic in size and shape.

In one embodiment of the present invention, multiple different sets of overlay data 314 representing multiple overlays can be stored in the overlay buffer 406, e.g., each set having a different color, different image, or different texture. These sets of the overlay data 314 may be referred to herein as "pages." In such embodiments, the values in the mask data 500 may also include information to allow the rendering logic 404 to identify the specific page(s) of the overlay data 314 and to only use the identified page(s) during a rendering operation. As such, in some embodiments, the values of mask data 500 contain indices to the pages of the overlay data 314 to allow the rendering logic 404 to switching among the different pages of the overlay data 314 during rendering operations.

In one embodiment of the present invention, the number of values of (or size of) each page of the overlay data 314 equals to the number of pixels in one frame of the video images 316 which in turn equals to the number of pixels in the combined display image 510. Thus there is a one-to-one relationship between each value of each page of the overlay data 314 and each pixel of the video image 316.

In another embodiment of the present invention, the number of values of (or size of) each page of the overlay data 314 may be less than the number of pixels in a frame of video images 316. Thus, each value of each page of the overlay data 314 may have a one-to-many relationship to the pixels of video images 316 such that a value of each page of the overlay data 314 corresponds to multiple pixels of a video image 316, thereby reducing the size of the overlay data 314 and reducing the memory requirements of the overlay buffer 406. For example, in some embodiments, the overlay data 314 contains a single color value such as an RGB (red green blue) color value where the entire overlay image (or overlay image segment) 508 is drawn as that single color value. In other embodiments, the different pages of the overlay data 314 are single values corresponding to single colors (e.g., different colors). In still other embodiments, single values may be intermingled with other pages that contain bitmapped images or other values within the overlay data 314.

Figure 6:
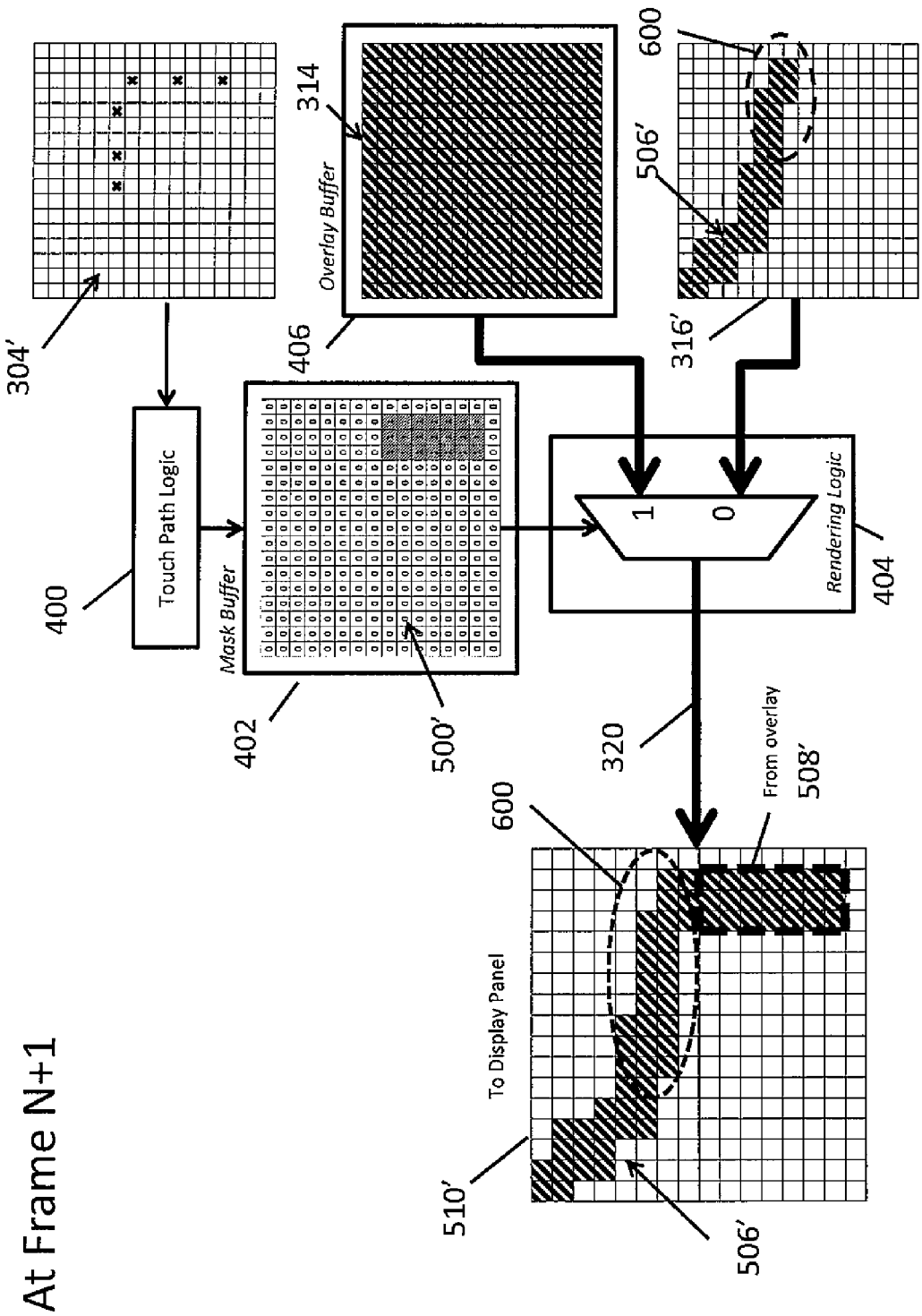
FIG. 6 is a schematic illustration of the combination of video image data, overlay data, and touch path information to generate second combined display image, in accordance with one embodiment of the present invention.

FIG. 6 is a schematic illustration of the combination of video image 316', overlay data 314, and touch path 304' to generate a second set of combined display images 510' during an N+1th frame (e.g., to generate Frame N+1), in accordance with one embodiment of the present invention. In a subsequent frame (e.g., at frame N+1, where N is the frame corresponding to the first set of combined display images 510), the video image 316' from the AP 202 includes image segment 600 that was not displayed in frame N (e.g., not in video image 316 as shown in FIG. 5). In addition, during frame N+1, the touch path logic 400 has calculated from the touch events 304' a different mask 500' that contains a different set of values from those of the mask 500 shown in FIG. 5. As such, the rendering logic 404 outputs a combined display image 506' that is a composition of the video image 316' from the AP 202 and the overlay data 314 according to the mask data 500'.

Figure 7:
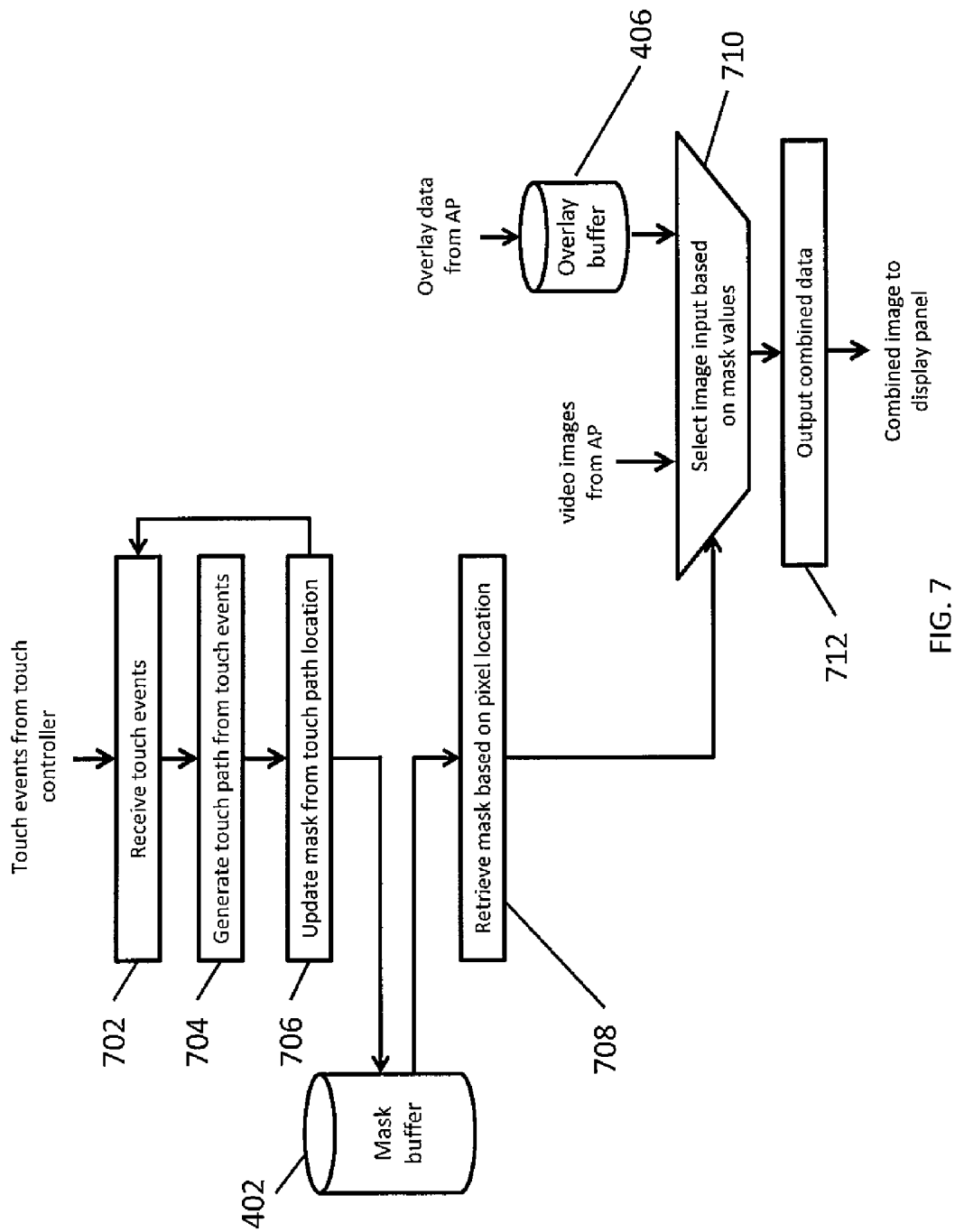
FIG. 7 is a flowchart illustrating a method for determining the application of the overlay data and combining the overlay data with video image in accordance with one embodiment of the present invention.

FIG. 7 is a flowchart illustrating a method for combining the overlay data with the video image to generate a combined display image in accordance with one embodiment of the present invention. Referring to FIG. 7, according to one embodiment of the present invention, in operation 702, touch events are received from an outside source (e.g., a touch sensor panel). A touch path (or estimated touch path) is generated from the touch events in operation 704 by interpolating or extrapolating between the touch events, where the interpolation method may be adjusted by parameters to configure, for example, width, style, straight or curved, region, and color of the overlay image segment 508 of the combined display image.

A mask data 500 is generated from the touch path in operation 706, where the relative positions of the values of the mask data 500 correspond to the relative positions of pixels of the display panel, and where the values of the mask data 500 indicate whether the corresponding pixel of the combined display image should contain either overlay data from the overlay buffer 406 or video image from AP, or a blended combination thereof. The mask data 500 is stored in a mask buffer 402. In operation 708, the mask data 500 is retrieved from the mask buffer 402, wherein the values retrieved are located in positions within the mask data 500 that correspond to the positions of the pixels currently being processed by the rendering logic.

In operation 710, the values of the mask data 500 corresponding to the positions of the currently-being-processed pixels in the display panel is used to selectively output either the overlay data from the overlay buffer 406 or the video image from the AP, or a blending thereof.

In operation 712, the combined display images are output and supplied to the display panel to display the overlay data 314 in composition with the video image.

As such, embodiments of the present invention provide a system and method for reducing overall system latency by introducing a low-latency loop inside the comparable high-latency loop.

Low-latency display images can be generated by combining information from mask data 500 generated from a touch path, overlay data 314 from an overlay buffer, and the high-latency video image from the AP. The touch path is calculated from touch events (e.g. outputs from the touch controller) recorded over time. The overlay data 314 can be provided by the AP or generated in the overlay system.

The overlay characteristics can be dynamically adjusted, including but not limited to color, dimensions (e.g., width), persistence, shading, and timing. These adjustments may be provided by the AP as a set of parameters or may be derived inside the overlay system, for example, by analyzing the video images from the AP). The adjustments can also be determined by touch behavior. For example, the width of the resulting line can be adjusted in accordance with the pressure applied to the touch sensor panel (e.g., the width parameter is proportional to the measured pressure of the touch events).

The display image is generated by the overlay system via the mask data 500, which is calculated from the touch path. The mapping and scaling parameters may be provided by the AP or may be calculated inside the overlay system by, for example, analyzing the touch events or the video images from the AP.

The overlay data can be merged with the video images from the AP at the pixel level by the rendering logic. In one embodiment, pixel characteristics from the video images are substituted with pixel characteristics from the overlay data in accordance with the values of the mask data. In other embodiments, new pixel characteristics are created based on a blending of the respective pixel characteristics from the video images and the overlay data.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A system comprising:
   a touch path logic configured to:
      receive a plurality of touch events from a touch sensor panel;
      compute an estimated touch path in accordance with the touch events;
      receive a parameter; and generate mask data based on the estimated touch path and the parameter; and a rendering logic configured to:
receive a video image;
receive the mask data from the touch path logic;
combine the video image with overlay data in accordance with the mask data to generate a combined display image; and
output the combined display image,
wherein the mask data comprises a matrix of numerical values, each of the numerical values identifying an operation of the rendering logic to produce the combined display image, and
wherein positions of the numerical values within the matrix correspond to positions of pixels in the combined display image.

2. The system of claim 1, wherein the video image comprises a displayed line and
wherein characteristics of the overlay data match characteristics of the displayed line.

3. The system of claim 2, wherein the characteristics comprise a color.

4. The system of claim 1, wherein the touch path logic is a component of an application processor, the application processor being configured to generate the video image.

5. The system of claim 1, wherein the touch path logic is a component of a display driver interface controller, the display driver interface controller being configured to receive the video image from an application processor and to supply the combined display image to a display panel.

6. The system of claim 1, wherein the touch path logic is a component of a touch controller coupled to a touch sensor panel, the touch controller being configured to receive a plurality of touch signals from the touch sensor panel and to generate the plurality of touch events.

7. The system of claim 1, wherein the rendering logic is configured to combine the video image with the overlay data by determining, for each pixel in the combined display image, whether to output a corresponding pixel of the video image or the overlay data in accordance with a value in a corresponding position of the mask data.

8. The system of claim 1, wherein the rendering logic is configured to combine the video image with the overlay data by determining, for each pixel in the combined display image, how to blend a corresponding pixel of the video image and the overlay data in accordance with a value in a corresponding position in the mask data.

9. The system of claim 8, wherein the blend is an edge-enhance operation, a dodge operation, a burn operation, or an alpha compositing effect.

10. The system of claim 1, wherein each of the numerical values of the mask data corresponds to exactly one pixel in the combined display image.

11. The system of claim 1, wherein each of the numerical values of the mask data corresponds to more than one pixel in the combined display image.

12. The system of claim 1, wherein the overlay data comprises a plurality of pages, and
wherein the mask data comprises information identifying at least one of the plurality of pages.

13. The system of claim 1, wherein the touch path logic is further configured to
receive the parameter from an application processor,
wherein the parameter controls a location of a mask region or controls a width, a style, or a shape of the estimated touch path.

14. The system of claim 1, further comprising:
an application processor configured to generate the video image,
wherein the rendering logic is a component of the application processor.

15. The system of claim 1, wherein the rendering logic is further configured combine the video image with the overlay data based on a subset of the touch events, the subset corresponding to a fixed number of video images.

16. The system of claim 1, wherein the rendering logic is further configured to combine the video image with the overlay data based on a subset of the touch events corresponding to a number of video images corresponding to a delay introduced by an application processor configured to supply the video image to the rendering logic.

17. The system of claim 1, wherein the rendering logic is further configured to combine the video image with the overlay data based on a subset of the touch events corresponding to a number of video images computed from a prior rendered output of an application processor configured to supply the video image to the rendering logic.

18. The system of claim 1, wherein the overlay data comprises a bitmapped image.

19. The system of claim 1, wherein the overlay data has a single color value.

20. The system of claim 1, wherein the rendering logic is configured to generate the overlay data without input from an application processor.

21. The system of claim 1, wherein the rendering logic is configured to generate the overlay data using data supplied from an application processor and data internal to the system.

22. The system of claim 1, wherein the rendering logic is configured to receive the overlay data from an application processor.

23. The system of claim 1, wherein the touch events are generated as the result of an interaction between a pointing implement and a touch input panel.

24. A method for providing visual feedback to touch input, the method comprising:
receiving a plurality of touch events from a touch sensor panel coupled to a display;
computing an estimated touch path in accordance with the touch events;
receiving a video image;
receiving a parameter;
generating mask data based on the estimated touch path and the parameter;
combining the video image with overlay data in accordance with the mask data to generate a combined display image; and
supplying the combined display image to the display,
wherein the mask data comprises a matrix of numerical values, each of the numerical values identifying an operation to produce the combined display image, and
wherein positions of the numerical values within the matrix correspond to positions of pixels in the combined display image.

25. The method of claim 24, wherein the video image comprises a displayed line, and
wherein characteristics of the overlay data match characteristics of the displayed line.

26. The method of claim 24,
wherein the parameter controls a location of the overlay data in the combined display image or controls a width, a style, or a shape of the estimated touch path.

27. The method of claim 24,
wherein the estimated touch path is computed based on a subset of the touch events corresponding to a fixed number of frames.

28. The method of claim 24,
wherein the estimated touch path is computed based on a subset of the touch events corresponding to a number of frames corresponding to a delay introduced by an application processor.

29. The method of claim 24,
wherein the estimated touch path is computed based on a subset of the touch events corresponding to a number of frames computed from a prior rendered output of an application processor.

30. The method of claim 24, wherein the overlay data comprises a bitmapped image.

31. The method of claim 24, wherein the overlay data has a single color value.

32. The method of claim 24, wherein further comprising generating the overlay data without input from an application processor.

33. The method of claim 24, wherein further comprising generating the overlay data using data supplied from an application processor and internal data.

34. The method of claim 24, wherein further comprising receiving the overlay data from an application processor.

35. The method of claim 24, further comprising determining, for each pixel in the combined display image, whether to output a corresponding pixel of the video image or the overlay data in accordance with a value in a corresponding position in the mask data.

36. The method of claim 24, further comprising determining, for each pixel in the combined display image, how to blend a corresponding pixel of the video image and the overlay data in accordance with a value in a corresponding position in the mask data.

37. The method of claim 36, wherein the blend is an edge-enhance operation, a dodge operation, a burn operation, or an alpha compositing effect.

38. The method of claim 24, wherein each of the numerical values of the mask data corresponds to exactly one pixel in the combined display image.

39. The method of claim 24, wherein each of the numerical values of the mask data corresponds to more than one pixel in the combined display image.

40. The method of claim 24, wherein the overlay data comprises a plurality of pages, and
wherein the mask data comprises information identifying at least one of the plurality of pages.

41. The method of claim 24, wherein the touch events are generated as the result of an interaction between a pointing implement and the touch sensor panel.

42. An accelerator for providing feedback in response to a path drawn on a display device comprising a touch sensor panel, an application processor, and a display, the accelerator comprising:
a processor; and
a memory having instructions stored thereon that, when executed by the processor, cause the processor to:
receive rendered video frames from the application processor;
receive a parameter from the application processor;
receive a plurality of touch signals from the touch sensor panel;
determine a touch path based on the touch signals;
generate mask data based on the touch path and the parameter;
update the rendered video frames based on the mask data and stored overlay data to generate updated video frames; and
output the updated video frames to the display,
wherein the mask data comprises a matrix of numerical values, each of the numerical values identifying an operation to produce the updated video frames, and
wherein positions of the numerical values within the matrix correspond to positions of pixels in the updated video frames.

* * * * *